US012569321B2

(12) United States Patent
Derzapf et al.

(10) Patent No.: US 12,569,321 B2
(45) Date of Patent: Mar. 10, 2026

(54) PROPOSING DENTAL RESTORATION MATERIAL PARAMETERS

(71) Applicant: DENTSPLY SIRONA Inc., York, PA (US)

(72) Inventors: Evgenij Derzapf, Lorsch (DE); Daniel Bielser, Schaffhausen (CH); Sandro Löschhorn, Niederglatt (CH)

(73) Assignee: Dentsply Sirona Inc., York, PA (US)

( * ) Notice: Subject to any disclaimer, the term of this patent is extended or adjusted under 35 U.S.C. 154(b) by 914 days.

(21) Appl. No.: 17/539,285

(22) Filed: Dec. 1, 2021

(65) Prior Publication Data

US 2023/0165666 A1 Jun. 1, 2023

(51) Int. Cl.
| | |
|---|---|
| *A61C 13/00* | (2006.01) |
| *G06T 7/10* | (2017.01) |
| *G06T 7/90* | (2017.01) |

(52) U.S. Cl.
CPC ............ *A61C 13/0004* (2013.01); *G06T 7/10* (2017.01); *G06T 7/90* (2017.01); *G06T 2200/04* (2013.01); *G06T 2207/20081* (2013.01); *G06T 2207/30036* (2013.01)

(58) Field of Classification Search
None
See application file for complete search history.

(56) References Cited

U.S. PATENT DOCUMENTS

| | | | | |
|---|---|---|---|---|
| 2004/0252303 | A1* | 12/2004 | Giorgianni | .............. G01J 3/508 |
| | | | | 356/402 |
| 2012/0205828 | A1 | 8/2012 | Laubersheimer et al. | |

| | | | | |
|---|---|---|---|---|
| 2014/0255875 | A1* | 9/2014 | Saliger | ..................... A61C 5/70 |
| | | | | 433/223 |
| 2017/0165038 | A1* | 6/2017 | Esbech | ................ A61C 13/082 |
| 2018/0028294 | A1 | 2/2018 | Azernikov et al. | |
| 2019/0029784 | A1* | 1/2019 | Moalem | ............. A61C 13/0004 |
| 2020/0397534 | A1 | 12/2020 | Farrelly et al. | |
| 2021/0153986 | A1 | 5/2021 | Wirjadi et al. | |
| 2022/0151733 | A1* | 5/2022 | Liu | ..................... A61C 13/0004 |
| 2022/0218449 | A1* | 7/2022 | Azernikov | ............ G06T 7/0012 |

(Continued)

FOREIGN PATENT DOCUMENTS

| | | |
|---|---|---|
| WO | WO-02076326 A2 | 10/2002 |
| WO | 02076326 | 2/2003 |

(Continued)

OTHER PUBLICATIONS

"European Application Serial No. 22847432.6, Response filed Jan. 9, 2025 to Communication pursuant to Rules 161(1) and 162 EPC mailed Jul. 9, 2024", 10 pgs.

(Continued)

*Primary Examiner* — Sarah Le

(74) *Attorney, Agent, or Firm* — SCHWEGMAN LUNDBERG & WOESSNER, P.A.

(57) ABSTRACT

A parameter recommendation module is used to propose a recommendation for dental restoration material parameters. The recommendation takes into consideration final tooth color influencing factors such as underlying tooth stump color and color of restoration fastening material such that at least one output restoration characteristic value needed to achieve a final user-specific tooth color for at least one tooth layer of the restoration is proposed.

17 Claims, 6 Drawing Sheets

(56) References Cited

U.S. PATENT DOCUMENTS

2023/0018199 A1*   1/2023   Mahamuni .......... G06F 11/3051
2023/0248243 A1*   8/2023   Moheb ................. A61B 5/7264
                                                                    433/29
2024/0054729 A1*   2/2024   Stoustrup ............. G06T 15/005

FOREIGN PATENT DOCUMENTS

WO      WO-2019023461 A1      1/2019
WO      WO-2023101868 A1      6/2023

OTHER PUBLICATIONS

"International Application Serial No. PCT/US2022/050742, International Preliminary Report on Patentability mailed Jun. 13, 2024", 9 pgs.
"International Application Serial No. PCT/US2022/050742, International Search Report mailed Mar. 20, 2023", 6 pgs.
"International Application Serial No. PCT/US2022/050742, Written Opinion mailed Mar. 20, 2023", 7 pgs.
"European Application Serial No. 22847432.6, Communication Pursuant to Article 94(3) EPC mailed Nov. 18, 2025", 17 pgs.

* cited by examiner

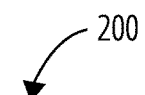
200

```
                        ┌─────────────┐
                        │ PROCESSING  │
                        │  UNIT 206   │
                        └──────▲──────┘
                               │
┌───────────┐          ┌───────▼──────┐          ┌──────────┐
│ GRAPHICS  │          │   NB/MCH     │          │  MAIN    │
│ PROCESSOR │◄────────►│    202       │◄────────►│ MEMORY   │
│   210     │          │              │          │   208    │
└───────────┘          └──────▲───────┘          └──────────┘

┌──────────┐   ┌──────────┐
                                                    │  AUDIO   │   │ SIO 236  │
                                                    │ ADAPTER  │   │          │
                                                    │   216    │   │          │
                                                    └──────────┘   └──────────┘

BUS 228       ┌──────────────┐   BUS 218
     ┌─────────────────►│  SB/ICH 204  │────────────────────────────────────┐
     │              ┌───┤              ├───┬──────┬──────┬──────┬──────┬─────┤
```

| DISK 226a | CD-ROM 230 | LAN ADAPTER 212 | USB AND OTHER PORTS 232 | PCI/PCIE DEVICES 234 | KEYBOARD AND MOUSE ADAPTER 220 | MODEM 222 | ROM 224 |

CODE 226b

NETWORK 214a

REMOTE SYSTEM 214b

STORAGE 214d

CODE 214c

FIG. 2

600

RECEIVE A THREE-DIMENSIONAL (3D) SCAN OF A DENTAL CAVITY OF A PATIENT
602

IDENTIFY, BY AN INPUT RESOURCE, INPUT DATA COMPRISING AT LEAST ONE FINAL TOOTH COLOR INFLUENCING FACTOR FOR A TRAINED RESTORATION MATERIAL PARAMETER RECOMMENDATION MODULE WHICH IS A TRAINED MACHINE LEARNING MODEL 604

EXTRACT, RESPONSIVE TO THE IDENTIFYING, ONE OR MORE FEATURES FROM THE INPUT DATA, THE ONE OR MORE FEATURES REPRESENTATIVE OF A REQUEST FOR COMPLETING A DESIGN AND/OR MACHINING PROCESS OF A RESTORATION 606

PROPOSE, USING THE TRAINED RESTORATION MATERIAL PARAMETER RECOMMENDATION MODULE, AT LEAST ONE OUTPUT RESTORATION CHARACTERISTIC VALUE NEEDED TO ACHIEVE A FINAL USER-SPECIFIC TOOTH COLOR FOR AT LEAST ONE TOOTH LAYER OF THE RESTORATION 608

FIG. 6

PROPOSING DENTAL RESTORATION MATERIAL PARAMETERS

TECHNICAL FIELD

The present invention relates generally to a method, system, and computer program product for proposing parameters of a dental restoration material. More particularly, the present invention relates to a method, system, and computer program product for automatically proposing a choice of restoration color and structure to achieve a defined observable color.

BACKGROUND

Presently, technology exists to design restorations and help manufacture them. For example, dental software can traditionally be used to produce restorations using input from dental professionals. The process may include an administration phase in which a restoration type such as single tooth restoration, bridge restoration or implant is selected for the patient. A tooth number for the restoration, restoration material and material color may then be selected. After the administration, a three-dimensional (3D) scan of the patient's dental cavity may be obtained with a dental scanner in an acquisition phase. In a next phase, a buccal registration of the patient's bite may be obtained, and the restoration may be digitally designed. After the design, the digital restoration may be manufactured based on selected manufacturing processes.

SUMMARY

The illustrative embodiments provide a method, system and computer program product for proposing dental restoration material parameters. In an aspect herein, a computer-implemented method is disclosed. The computer-implemented method comprises the steps of receiving a three-dimensional (3D) scan of a dental cavity of a patient, identifying, by an input resource, input data comprising at least one final tooth color influencing factor for a trained restoration material parameter recommendation module, extracting, responsive to the identifying, one or more features from the input data, the one or more features representative of a request for completing a design and/or machining process of a restoration, and proposing, using the trained restoration material parameter recommendation module, at least one output restoration characteristic value needed to achieve a final user-specific tooth color for at least one tooth layer of the restoration. The final user-specific tooth color may be representative of an observed color of the restoration after installation in a patient's oral cavity, said observed color being influenced by said at least one final tooth color influencing factor. Further, the trained restoration material parameter recommendation module may operate as a machine learning engine.

The method selecting the at least one final tooth color influencing factor for the input data is selected from the list consisting of physical characteristics of one or more portions of a restoration block or restoration material, physical characteristics of one or more portions of an oral cavity, scanner properties, a customer color preference, and manufacturing device available.

The method may also include training a component machine learning model of an untrained version of the subsequently trained restoration material parameter recommendation module using a training input dataset that includes training input images and/or shades and stored corresponding training output restoration characteristic values obtained from a plurality of training restoration blocks and/or 3d printer materials that are selected to have properties that provide a plurality of final user-specific training tooth colors. Other technical features may be readily apparent to one skilled in the art from the following figures, descriptions, and claims.

In another aspect, a computer system is disclosed. The computer system may include a processor configured to perform the steps including receiving a three-dimensional (3D) scan of a dental cavity of a patient, identifying, by an input resource, input data that comprises at least one final tooth color influencing factor for a trained restoration material parameter recommendation module, extracting, responsive to the identifying, one or more features from the input data, the one or more features representative of a request for completing a design and/or machining process of a restoration, and proposing, using the trained restoration material parameter recommendation module, at least one output restoration characteristic value needed to achieve a final user-specific tooth color for at least one tooth layer of the restoration. The final user-specific tooth color may be representative of an observed color of the restoration after installation in a patient's oral cavity, said observed color being influenced by said at least one final tooth color influencing factor.

In yet another aspect, a non-transitory computer-readable storage medium is disclosed. The non-transitory computer-readable storage medium may store a program which, when executed by a computer system, causes the computer system to perform a procedure comprising receiving a three-dimensional (3D) scan of a dental cavity of a patient, identifying, by an input resource, input data comprising at least one final tooth color influencing factor for a trained restoration material parameter recommendation module, extracting, responsive to the identifying, one or more features from the input data, the one or more features representative of a request for completing a design and/or machining process of a restoration, and proposing, using the trained restoration material parameter recommendation module, at least one output restoration characteristic value needed to achieve a final user-specific tooth color for at least one tooth layer of the restoration, the final user-specific tooth color being representative of an observed color of the restoration after installation in a patient's oral cavity.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 2 depicts a block diagram of a data processing system in which illustrative embodiments may be implemented;

FIG. 6 depicts a method in accordance with one or more illustrative embodiments:

DETAILED DESCRIPTION

Figure 1:
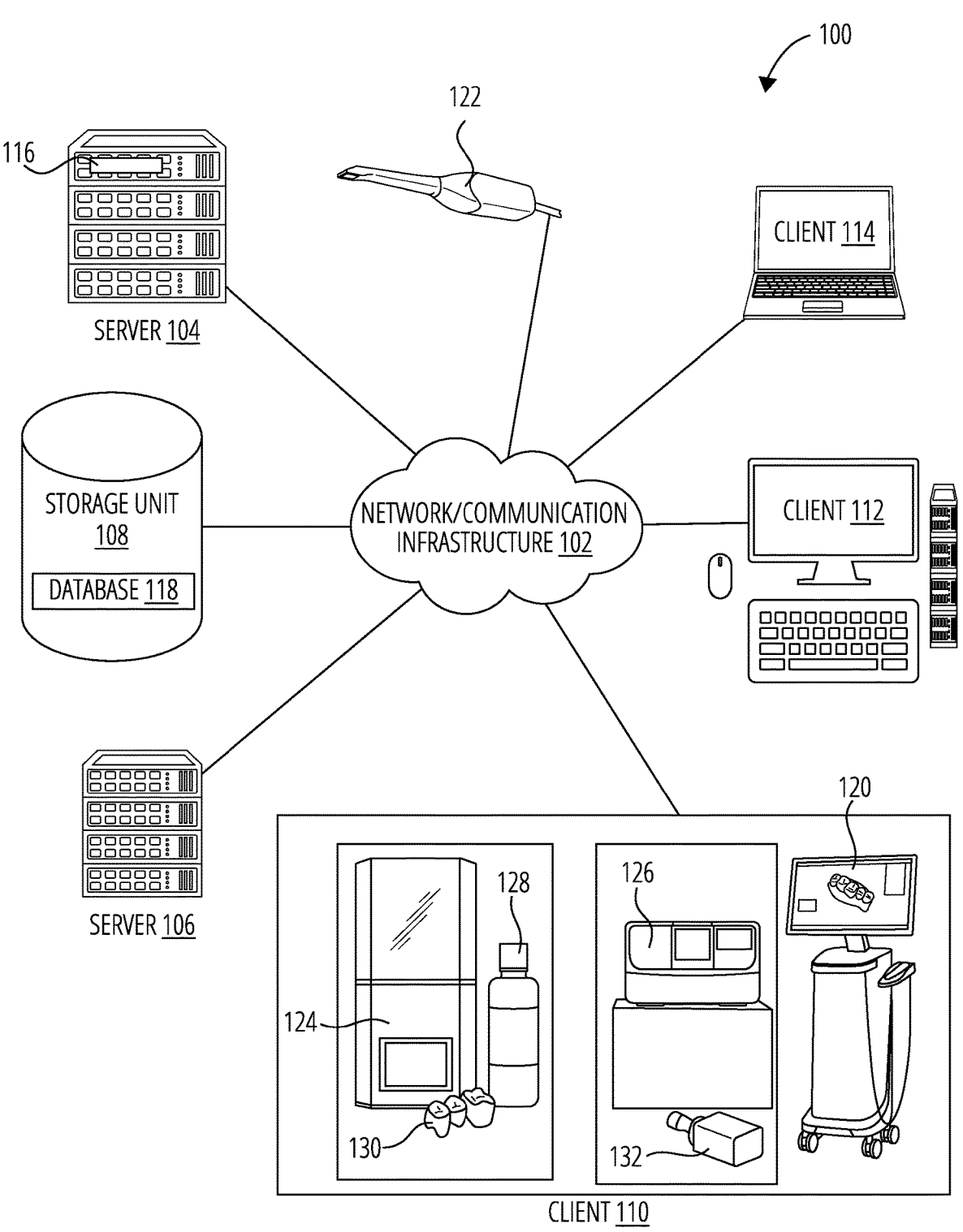
FIG. 1 depicts a block diagram of a network of data processing systems in which illustrative embodiments may be implemented.

The illustrative embodiments recognize that the user of a dental CAD/CAM software for restoration design and manufacturing may have to decide what color a restoration should have. The user may have to be experienced enough to choose a color (e.g., Color A2) to use to produce a final color A1 that can be observed after it has been influenced by other manufacturing and physical factors. This may effectively be a guess and may require significant expert skill and trial and error which may not be feasible or appropriate for long term practice.

As an example, a dental practitioner, upon scanning a patient's jaws for a dental procedure, manually configures restoration and manufacturing parameters by modification of default parameters presented by a software. This is time consuming, error-prone and often not optimal for the particular patient because there may be a lack knowledge about the user specific parameters and how they depend on each other.

The illustrative embodiments thus recognize that presently available tools or solutions do not address the need to provide intelligent management of dental workflow configurations to provide optimized restorations in a timely manner. The illustrative embodiments used to describe the invention generally employ a machine learning engine to configure dental restoration parameters in a patient and/or user specific manner through intelligent recommendations.

Such configuration may include determining the final observable color of restorations based on several factors including, but not limited to a color of neighboring teeth, a color of underlying tooth stump, a patient tooth color wish, a shape of the different layers of restoration blocks, a color of fastening medium (glue etc.), a thickness of the restoration, and a calibration of the camera used for imaging. These factors and other factors such as translucency, transparency and reflection behavior of objects in the workflow may be taken into account to determine the choice of material and material layers. Further, the device used for manufacturing may also be taken into account. For example, by using a milling or grinding device there may be a fixed presetting of layers in a restoration block and their color and positioning of a design restoration in the block prior to manufacturing. By using a 3D printer, the form and color of the layers can be chosen with precision such as voxel by voxel.

Thus, in an embodiment, an automatic choice of restoration color and structure of the layers of the restoration that will enable a final desired restoration property to be observed, after being influenced by other "influencing" properties, may be shown. A deep neural network may be used to generate proposals based on images generated by an intraoral scanner, said images including, for example the color of neighboring restorations and the underlying stump and/or detected shade of teeth. By so doing, there may be more accurate determination of the restoration color without consulting other devices or persons, resulting in the saving of costs and reducing errors.

In an embodiment increasing complexity of desired restoration properties may be achieved based on automatically deciding best fit monochromatic color blocks, multichromatic color blocks or complete color and material structures needed for efficient results. For example, for a monochromatic color block, the deep neural network may execute a calibration between color values taken from intraoral camera images and the material color to be used to achieve desired results. Doing so, the neural network may learn from the images which tooth portions may be more strongly considered as being influential in the color proposals. To limit the analysis to neighboring teeth and remaining tooth regions near a preparation site, automatic tooth segmentation may be employed in preprocessing steps. Automatic proposal may be corrected by the user, if inaccurate, and the deep neural network to get better and better by a back propagation of the results. In another example, for multichromatic blocks, proposals about the positioning of digital restorations in a particular multichromatic block to achieve an outward tooth appearance that also takes into consideration external factors such as thickness of restoration materials, refraction of light by restoration materials etc. may be produced. Further, for 3D printing, wherein restoration blocks may not be used, the deep neural networks may generate proposals of material structures and colors for a print or sintering process.

In a further embodiment, the deep neural network may be trained as follows. A large number of training images of result restoration structures as well as a scan of models may be provided. Herein, internal structures made from different colors and materials of restoration blocks or 3D printing materials may be provided. Corresponding restorations may be manufactured and installed on corresponding models having desired neighboring properties or on corresponding oral cavities. A scan of the models or oral cavities and/or installed restorations may provide an input training dataset that corresponds to known properties of said internal structures which may serve as an output training dataset. By providing the input training dataset, in the form of, for example, color values, to the deep neural network configured with respective input layers and/or hidden nodes, the obtained output probabilities showing ideal properties of blocks/materials/internal structures required to observe desired final tooth colors may be compared with the output training dataset and the weights within the deep neural network may be optimized to minimize a loss function. Further, depending on the granularity of output proposals from the deep neural network, thousands of such training datasets may be necessary. An economic acquisition of such a number of training data sets may require the acquisition of result data of diverse users and therefore the inserted restorations may have to be scanned again. By integrating a rescan into the dental restoration workflow data may flow back from every use case for use in training.

After training, in an application phase, a scan of the tooth to be restored and/or of the neighboring teeth may be used as an input and therefrom the deep neural network may propose the internal structure of the teeth to be manufactured as an output to obtain final observable tooth properties such as final observable tooth color. Herein the term "final" may generally refer to property values observed after installation of a restoration wherein said property values may be different from their original values due to being influenced by other factors. For example, a restoration may be manufactured using a block or 3D printer material with monochromatic or multichromatic color A1, however due to a small thickness and a translucency of the restoration, a tooth stump below the installed restoration may render the installed restoration to have an observed monochromatic or multichromatic color A2 that is different from A1. Color A2 may thus be the "final" observable color.

Further, because volume data and their properties may be taken from surface scans, for every surface point all contributions of the single camera images together with their imaging directions may be stored and provided to the deep neural network. Furthermore, to take into account of the refraction between air and dentin and/or enamel, the surface normal of every image point may be delivered as different imaging directions from the surface normal may lead to different color information for one same surface point.

Further, in another embodiment, in a realization step of the implementation of the deep neural network, the possible number of proposals may be limited. Therefore, a limited number of reference examples (e.g., dozens) with empirically gained and meaningful properties of internal structures/blocks/materials and applied scans may be generated to form an input-output training dataset. This may work as base function which span the solution space of the possible internal structures. A respective AI/deep neural network/ machine learning model may find some weights for the base functions which may be realized with a distinct reduced number of training examples. Alternatively, the weights for the base functions may be found directly by an optimization algorithm. Herein, no further training examples may be necessary. In designing the base functions for all teeth to be similar, a missing or strongly defect tooth may be concluded from the analysis of a neighboring tooth.

These examples of settings, configurations, parameters, properties and the like are not intended to be limiting. From this disclosure, those of ordinary skill in the art will be able to conceive many other aspects applicable towards a similar purpose, and the same are contemplated within the scope of the illustrative embodiments.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other dental system, structures, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment is a network of computers in which the illustrative embodiments may be implemented. Data processing environment 100 includes network/communication infrastructure 102. Network/communication infrastructure 102 is the medium used to provide communications links between various devices, databases and computers connected together within data processing environment 100. Network/communication infrastructure 102 may include connections, such as wire, wireless communication links, or fiber optic cables.

Clients or servers are only example roles of certain data processing systems connected to network/communication infrastructure 102 and are not intended to exclude other configurations or roles for these data processing systems. Server 104 and server 106 couple to network/communication infrastructure 102 along with storage unit 108. Software applications may execute on any computer in data processing environment 100. Client 110, client 112, client 114 are also coupled to network/communication infrastructure 102. Client 110 may be a dental acquisition unit with a display. A data processing system, such as server 104 or server 106, or clients (client 110, client 112, client 114) may contain data and may have software applications or software tools executing thereon.

Only as an example, and without implying any limitation to such architecture, FIG. 1 depicts certain components that are usable in an example implementation of an embodiment. For example, servers and clients are only examples and do not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Dental scanner 122 includes one or more sensors that may measure tooth geometry and/or color by obtaining a plurality of images through projections and combining the projections to obtain a three-dimensional (3D) image. In an example, the dental scanner 122 captures data points as often as several thousand times each second, automatically registering the sizes and shapes of each tooth. It continuously sends this data to the connected computer's software, which builds it into a 3D impression of the patient's oral cavity.

A most widely used digital format is the STL (Standard Tessellation Language) format. This format describes a succession of triangulated surfaces where each triangle is defined by three points and a normal surface. STL files may describe only the surface geometry of a three-dimensional object without any representation of color, texture or other CAD model attributes. However, other file formats have been developed to record color, transparency, or texture of dental tissues (such as Polygon File Format, PLY files) and may also be used. Irrespective of the type of imaging technology employed, scanners or cameras project light that is then recorded as individual images and compiled by the software after recognition of POI (points of interest). For example, two coordinates (x and y) of each point are evaluated on the image, and the third coordinate (z) is then calculated depending on a distance from the scanner.

Client application 120 or any other application 116 implements an embodiment described herein. Client application 120 can use data from dental scanner 122 to generate restoration material parameters needed to achieve a final user-specific tooth color/structure. Client application 120 may also automatically derive input data from an input resource module 324 for use in proposing restoration material parameters. Client application 120 may propose parameters of restoration blocks 132 for the milling/grinding machine 126 or parameters of 3D printer materials 128 (e.g., resins) for the 3d printer 124. Said proposed parameters may then be used to produce a user specific restoration 130.

Client application 120 can also execute in any of data processing systems (server 104 or server 106, client 110, client 112, client 114), such as client application 116 in server 104 and need not execute in the same system as client 110.

Server 104, server 106, storage unit 108, client 110, client 112, client 114, may couple to network/communication infrastructure 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes an application 116 that may be configured to implement one or more of the functions described herein for displaying a live control view in accordance with one or more embodiments.

Server 106 may include a search engine configured to search stored files such as images, 3D models of patients and preferences for a dental practice in response to a request from an operator as described herein with respect to various embodiments.

In the depicted example, data processing environment 100 may be the Internet. Network/communication infrastructure 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of dental practices, commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such client 110, client 112, client 114 or s server 104, server 106, in FIG. 1, or another type of device in which computer usable program code or instructions implementing the processes may be located for the illustrative embodiments.

Data processing system 200 is described as a computer only as an example, without being limited thereto. Implementations in the form of other devices, in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCL/PCIe devices 234 may include, for example. Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226*a* and CD-ROM 230 may use, for example, an integrated drive electronics (IDE), serial advanced technology attachment (SATA) interface, or variants such as external-SATA (eSATA) and micro-SATA (mSATA). A super IVO (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226*a*, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 116 and client application 120 in FIG. 1, are located on storage devices, such as in the form of codes 226*b* on Hard disk drive (HDD) or solid-state drive (SSD) 226*a*, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226*b* may be downloaded over network 214*a* from remote system 214*b*, where similar code 214*c* is stored on a storage device 214*d* in another case, code 226*b* may be downloaded over network 214*a* to remote system 214*b*, where downloaded code 214*c* is stored on a storage device 214*d*.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NBIMCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226*a* is manifested as a virtualized instance of all or some portion of Hard disk drive (HDD) or solid-state drive (SSD) 226*a* that may be available in the host data processing system. The host data processing system in such cases is represented by data processing system 200.

Figure 3:
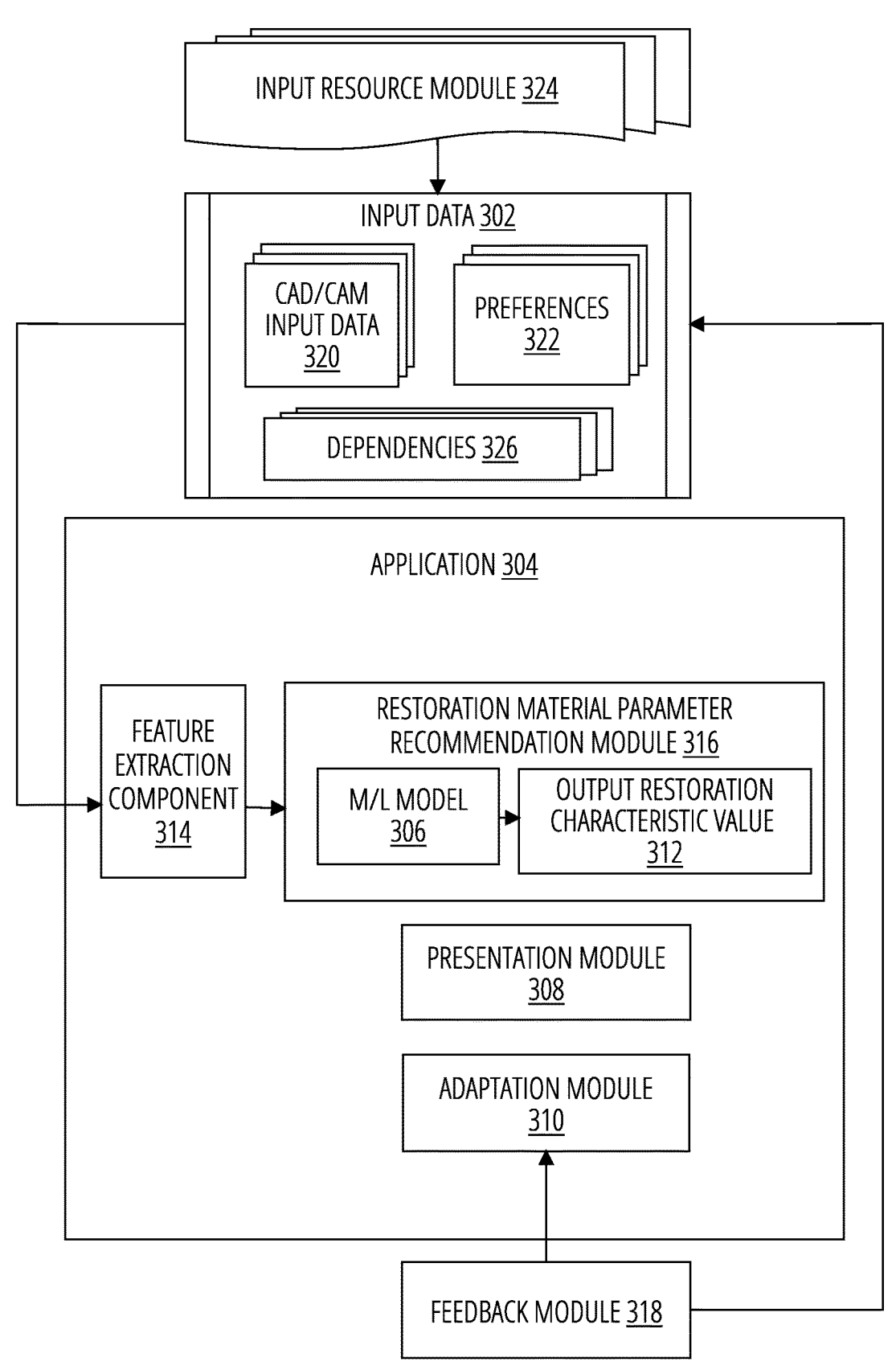
FIG. 3 depicts a block diagram of an example configuration for intelligent proposal of restorations and dental/ workflow parameters for machining in accordance with one or more illustrative embodiments.

With reference to FIG. 3, this figure depicts a block diagram of an example configuration for intelligent proposal of restorations and dental restoration material parameters in accordance with an illustrative embodiment. Application 304 is an example of any of server applications 116 or client application 120 in FIG. 1, depending on the particular implementation.

In one aspect, application 304 may receive a three-dimensional (3D) scan of a dental cavity of a patient, and identify, by an input resource module 324, input data that includes at least one final tooth color influencing factor. The input data may be used as input for a trained restoration material parameter recommendation module and the trained restoration material parameter recommendation module may extract, responsive to the identifying, one or more features from the input data, the one or more features representative of a request for completing a design and/or machining process of a restoration. The trained restoration material parameter recommendation module may then propose at least one output restoration characteristic value needed to achieve a final user-specific tooth color for at least one tooth layer of the restoration. Herein, the final user-specific tooth color may be representative of an observed color of the restoration after installation in a patient's oral cavity, due to, for example, an initial color being influenced by said at least one final tooth color influencing factor. Furthermore, the trained restoration material parameter recommendation module may operate as a machine learning engine.

The input resource module 324 may be a dental software component that retrieves and/or prepares, from the dental scanner 122 and/or other sources, the input data 302. The input data 302 may be representative of at least one final tooth color influencing factor such as physical characteristics of one or more portions of a restoration block or restoration material (e.g., a shape or color of different layers of a restoration block, a color of a fastening medium (e.g. glue), a restoration thickness, translucency, transparency and reflection behavior of restoration block or material, etc.), physical characteristics of one or more portions of an oral cavity (e.g. a color of an underlying tooth stump, a color of neighboring teeth,), scanner properties (e.g., a camera color calibration such as a color mapping, lighting conditions, etc.), a customer color preference, manufacturing device available (e.g. milling or grinding device or 3d printer). Knowledge of these properties may increase the accuracy of proposals. For example, light shining through a thin veneer may cause different final observed colors than the original chosen color if the veneer thickness and material type is not taken into consideration or a dark yellow underlying tooth stump may change the appearance of a restoration or veneer if the color of the underlying tooth stump is not taken into consideration. In a specific example, a color input obtained from the dental scanner 122 is an array of color values (such as a color mapping) or texture for 3D points in a 3D image or segmented 3D image obtained based on the dental scanner 122. Further, the input data may comprise other factors that do not influence final tooth color such as position of the preparation site in the oral cavity.

The input resource module 324 may automatically detect a drilled cavity in an image, or a preparation site, by for example, image analysis and may automatically segment portions of the teeth or oral cavity to limit a subsequent analysis, by the deep neural network described herein, to neighboring teeth and/or portions of the preparation site such as a tooth stump. Thus, the input data may be selected to be representative of a segment of a tooth obtained from a segmentation process, i.e., the input data includes physical characteristics of one or more portions of an oral cavity and the one or more portions of the oral cavity includes a segmented portion of a tooth obtained by a segmentation process, and at least one output restoration characteristic value may be proposed based on the segmented portion.

Further, the input resource module 324 may detect from preferences 322 obtained from, for example, a patient profile, a practitioner profile, a group profile, connected devices etc. From a patient profile, a particular color of restoration 130 may be preferred. Input data 302 obtained directly from the dental scanner 122 may generally be referred to herein as CAD/CAM input data 320 and input data 302 regarding appropriateness of output proposals, based on, for example, specific available device types may be generally referred to herein as dependencies 326. Further, individual portions of the input data 302 may be weighted or prioritized to drive corresponding changes in proposals. These dependencies may be otherwise be complex, need significant skill when chosen manually and their significance on final user-specific tooth colors may not always be clearly understood by every user. Thus, not taking said dependencies into account may result in sub-optimal restoration results, processes and cost.

In an embodiment, feature extraction component 314 is configured to generate relevant features for a proposal based on data from all the different available features (e.g., CAD/CAM input data 320, preferences 322). The embodiment, feature extraction component 314 may be part of the restoration material parameter recommendation module 316, which may comprise a deep neural network/m/l model 306 (machine learning model). In other embodiments, feature extraction component 314 may be a feature selection component and may be separate from the restoration material parameter recommendation module 316. In an embodiment, feature extraction component 314 is a feature selection component outside the deep neural network and may receive a request from application 304 which includes at least an identification of a recommendation/proposal type needed (e.g., a request to propose restoration material parameters needed to produce and install a restoration in user X, said installed restoration have final color $X_{C1}$). The feature extraction component 314 may process or use a combination of CAD/CAM input data 320 that may be relevant to the request or proposal needed. In the embodiment, feature extraction component 314 may use a defined algorithm of prioritization or dependencies to generate the features as input for the restoration material parameter recommendation module 316. In another embodiment, feature extraction component 314 is part of restoration material parameter recommendation module 316 and thus the input data 302 may be provided to the restoration material parameter recommendation module 316 to obtain proposals of output restoration characteristic values 312 which may be a matrix of probability values representative of one or more characteristics of the restoration material to be used to obtain said final user-specific tooth color. The output restoration characteristic value 312 may comprise a proposal of an optimal positioning 410 of the restoration inside a digital restoration block 402 to achieve desired observed colors for different sections of the restoration. This may be ideal for cases where only milling/grinding machines 126 are available for restoration production. The output restoration characteristic value 312 may also comprise a proposal of an optimal initial color of a restoration block or an internal structure of the restoration block needed to achieve desired observed final colors. Further, the output restoration characteristic value 312 may include a proposal of at least one internal structure of a restoration block needed to achieve desired observed colors for different sections of the final restoration. The output restoration characteristic value 312 may also comprise a proposal of at least one manufacturing process required to achieve the final user-specific tooth color (e.g., a proposal that, to achieve a best final color, the user may use a 3D printer 124 instead of a milling/grinding machine 126). The output restoration characteristic value may also comprise a proposal of at least one color of a 3D volume of material required of a 3D printer required to achieve the final user-specific tooth color (e.g., for a 3D printer 124, the user may have more control of the final user-specific tooth color as the color of each voxel of the restoration for printing by the 3D Printer 124 may be determinable). Even further, a series of output proposal options about the restoration parameters such as restoration materials, positioning of digital restoration in a digital restoration block 402, and corresponding manufacturing devices to use, along with probabilities, for each member of the series, of successfully achieving the final user-specific tooth color after installation of the restoration in an oral cavity, may also be generated. This may be a matrix that may be further processed to be presented as options of varying confidence/percentage values or intervals in a user understandable manner.

Figure 4:
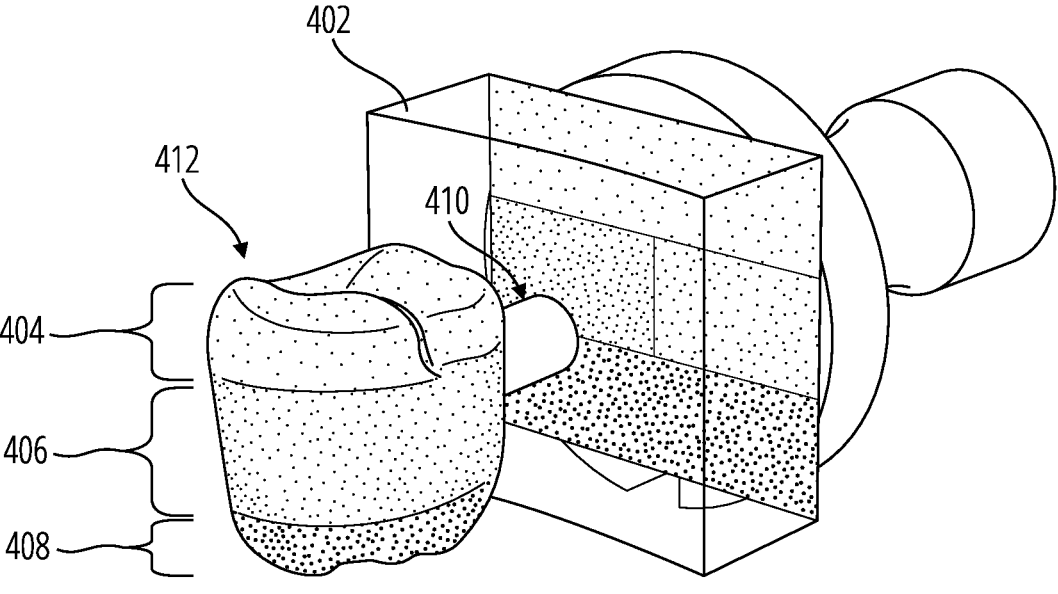
FIG. 4 depicts a restoration block in accordance with one or more illustrative embodiments.

FIG. 4 shows the digital restoration block 402 according to one or more embodiments. The digital restoration block 402 may have a plurality of layers such as a first layer 404, a second layer 406 and a third layer 408. The layers may have boundaries of any shape such as a straight or curved boundary. The shape or color of different layers of the restoration block may be obtained via defined layers provided in a 3D image of the restoration block or 3D model of the restoration block. By being able to propose a particular digital restoration block 402 and a position 410 of the digital restoration 412 inside the digital restoration block 402, the final user-specific tooth color may be controllable by the restoration material parameter recommendation module 316 with a high degree of confidence. Thus, in the embodiment where a restoration block is used, the output restoration characteristic values 312 may include a tooth color or plurality of tooth colors chosen by a decision of a restoration block type and positioning in said restoration. This may enable the observation of a corresponding desired final tooth color or plurality of final tooth colors after said restoration is manufactured and installed in the oral cavity.

The restoration material parameter recommendation module 316 can be based, for example, on an artificial machine learning neural network such as a convolutional neural network (CNN), though it is not meant to be limiting. It may be a feed-forward artificial neural network which in a classic form may comprise a convolutional layer, followed by a pooling layer. The CNN learns by learning free parameters or classifiers of the convolution kernel per layer and their weighting when calculating the next layer.

A training of the m/l model 306 or restoration material parameter recommendation module 316 according to an illustrative embodiment is discussed hereinafter.

In an illustrative embodiment, presentation module 308 of application 304 displays proposals obtained from the restoration material parameter recommendation module 316. The presentation module 308 may display, for example, plurality of options for 3D printer materials 128, 3d printers 124, restoration blocks 132 or milling/grinding machines 126 as well as corresponding probabilities of achieving a desired color outcome after restoration installation. An adaptation module 310 may be configured to receive input from the practitioner to adapt the output restoration characteristic values 312 if necessary. For example, changing a final user-specific tooth color may cause recalculation of proposed output restoration characteristic values 312 for presentation by the presentation module 308.

A proposed option may be preselected based on the corresponding probability.

As new tools and materials with specific instructions and requirements are added to a dental workflow, the restoration material parameter recommendation module 316 may be retrained and a need for the practitioner to be intimately aware of the effects on final user-specific tooth colors may be significantly reduced. Feedback module 318 optionally collects user feedback 322 indicative of an accuracy of the output restoration characteristic values 312. In one embodiment, application 304 is configured not only to present recommendations but also to provide a method for a user to input a feedback. Feedback module 318 applies the feedback in a machine learning technique such as to dependencies 326 or user profiles to modify the m/l model 306 used in the restoration material parameter recommendation module 316.

The neural network m/l model 306 may be trained using various types of training data sets. The training may include using a training dataset that comprises training input images and/or corresponding shades/color mappings and corresponding training output restoration characteristic values obtained from a plurality of corresponding training restoration blocks and/or 3d printer materials. The corresponding training output restoration characteristic values may be representative of properties of the training restoration blocks and/or 3d printer materials.

More specifically, the training may include providing a plurality of training restoration blocks and/or 3d printer materials and manufacturing a plurality of corresponding restorations using said plurality of training restoration blocks and/or 3d printer materials. The plurality of training restoration blocks and/or 3D printer materials may be selected by an expert to have certain known properties that provide the installed restoration with an observed color, after installation, that matches a desired color, an example of such a desired color being a color of neighboring teeth. The known properties may be stored as stored corresponding training output restoration characteristic values. The manufactured restorations may be installed on corresponding physical models or oral cavities. Said corresponding physical models or oral cavities may be scanned to obtain corresponding images and/or shades for use as part of a training input dataset. The training input dataset may be used as input to the machine learning model and corresponding output restoration characteristic values thereof may be obtained from the machine learning model. The corresponding output restoration characteristic values may then be compared to the stored corresponding training output restoration characteristic values.

Figure 5:
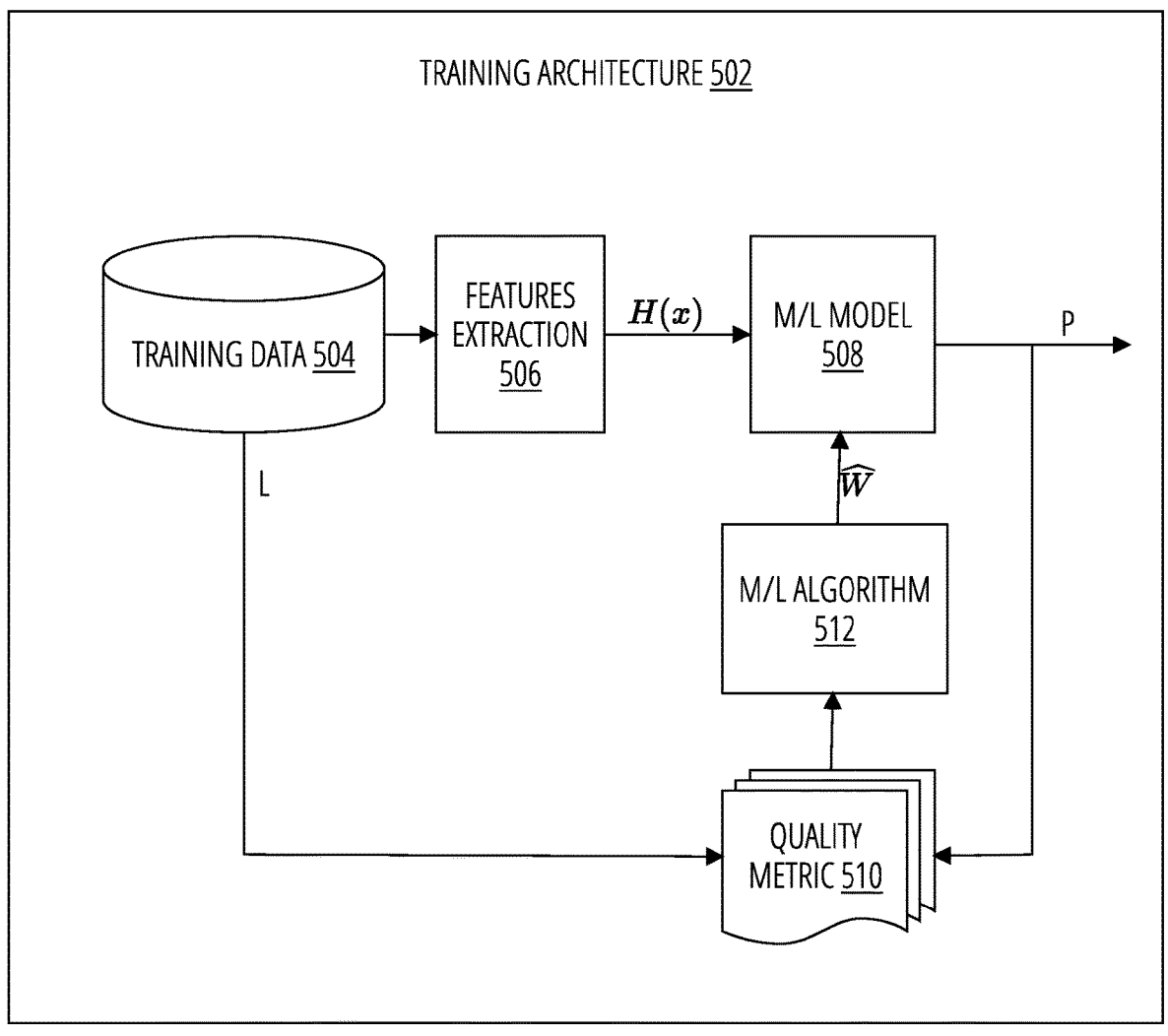
FIG. 5 depicts a block diagram of an example training architecture for machine-learning based recommendation engine in accordance with one or more illustrative embodiments.

FIG. 5 shows an example training architecture 502. In an embodiment, upon receiving a request to provide a proposal, application 304 creates an array of values that are input to the input neurons of the m/l model 306 to produce an array that contains the recommendation/output restoration characteristic value 312. As shown in FIG. 5, which depicts a block diagram of an example training architecture 502 for machine-learning based proposal generation in accordance with an illustrative embodiment, program code extracts various features/attributes 506 from training data 504 with the training data entries having labels L. The features are utilized to develop a predictor function. H(x) or a hypothesis, which the program code utilizes as a machine learning model 508. In identifying various features/attributes in the training data 504, the program code may utilize various techniques including, but not limited to, mutual information, which is an example of a method that can be utilized to identify features in an embodiment. Other embodiments may utilize varying techniques to select features, including but not limited to, principal component analysis, diffusion mapping, a Random Forest, and/or recursive feature elimination (a brute force approach to selecting features), to select the features. "P" is the output (e.g., restoration materials parameters and/or probabilities) that can be obtained, which when received, could further trigger the dental system to perform other steps such as display options or start a machining process. The program code may utilize a machine learning algorithm 512 to train machine learning model 508, including providing weights for the outputs, so that the program code can prioritize various changes based on the predictor functions that comprise the machine learning model 508. The output can be evaluated by a quality metric 510.

By selecting a diverse set of training data 504, the program code trains machine learning model 508 to identify and weight various attributes of patients, practitioners, devices connected to the dental system, etc. To utilize the machine learning model 508, the program code obtains (or derives) input data or features to generate an array of values to input into input neurons of a neural network. Responsive to these inputs, the output neurons of the neural network produce an array that includes the output restoration characteristic values 312 that may be presented contemporaneously on a display.

Further, in another embodiment, the possible number of proposals may be limited. Herein, a limited number of reference examples with empirically gained and meaningful properties of internal structures/blocks/materials and applied scans may be generated to form an input-output training dataset. This may serve as a base function which spans the solution space of the possible internal structures. The machine learning model may then find some weights for the base functions which may be realized with a distinct reduced number of training examples. Alternatively, the weights for the base functions may be found directly by an optimization algorithm. Herein, no further training examples may be necessary. In designing the base functions for all teeth to be similar, a missing or defective tooth may be concluded from the analysis of a neighboring tooth.

With reference to FIG. 6, a process 600 or proposing dental restoration material parameters is disclosed. In step 602, process 600 may receive a three-dimensional (3D) scan of a dental cavity of a patient. In step 604, process 600 may identify, by an input resource, input data comprising at least one final tooth color influencing factor for a trained restoration material parameter recommendation module. In step 606, process 600 may extract, responsive to the identifying, one or more features from the input data, the one or more features representative of a request for completing a design and/or machining process of the restoration. In step 608, process 600 may propose, using the trained restoration material parameter recommendation module, at least one output restoration characteristic value needed to achieve a final user-specific tooth color for at least one tooth layer of the restoration. Herein the final user-specific tooth color may be representative of an observed color of the restoration after installation in a patient's oral cavity, the observed color being influenced by the at least one final tooth color influencing factor such as a color of an underlying tooth stump. The trained restoration material parameter recommendation module may operate as a machine learning engine.

The process 600 may include scanning, by an intraoral scanner, the oral cavity of the patient's oral cavity to obtain at least a portion of the input data.

Thus, a computer implemented method, system or apparatus, and computer program product are provided in the illustrative embodiments for intelligent proposals and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising: receiving a three-dimensional (3D) scan of a dental cavity of a patient; identifying, by an input resource, input data comprising at least one final tooth color influencing factor for a trained restoration material parameter recommendation module, the trained restoration material parameter recommendation module implemented as a neural network executing on a processor; extracting, responsive to the identifying, one or more features from the input data, the one or more features representative of a request for completing a design and/or machining process of a restoration, and presenting on a display, using the trained restoration material parameter recommendation module, at least one output restoration characteristic value needed to achieve a final user-specific tooth color for at least one tooth layer of the restoration, the final user-specific tooth color representative of an observed color of the restoration after installation in a patient's oral cavity, said observed color being influenced by said at least one final tooth color influencing factor; wherein the at least one final tooth color influencing factor for the input data comprises one or more of: physical characteristics of one or more portions of a restoration block or restoration material, physical characteristics of one or more portions of an oral cavity, scanner properties, a customer color preference, or manufacturing device available; wherein the trained restoration material parameter recommendation module is trained using a training input dataset that includes training input images and/or shades and stored corresponding training output restoration characteristic values obtained from a plurality of training restoration blocks and/or 3D printer materials that are selected to have properties that provide a plurality of final user-specific training tooth colors, wherein the training includes: providing the plurality of training restoration blocks and/or 3D printer materials; manufacturing a plurality of corresponding restorations using said plurality of training restoration blocks and/or 3D printer materials; installing the manufactured plurality of corresponding restorations on corresponding physical models or oral cavities; scanning said physical models or oral cavities to obtain corresponding images and/or shades for use as part of the training input dataset; providing the training input dataset as input to an untrained restoration material parameter recommendation module to produce the trained restoration material parameter recommendation module; obtaining corresponding output restoration characteristic values from the trained restoration material parameter recommendation module; and comparing said corresponding output restoration characteristic values to the stored corresponding training output restoration characteristic value.

2. The method of claim 1, wherein the input data is selected to be representative of a segment of a tooth obtained from a segmentation process.

3. The method of claim 1, wherein the input data further comprises at least one other factor that does not influence final tooth color.

4. The method of claim 1, further comprising:
scanning, by an intraoral scanner, the patient's oral cavity to obtain at least a portion of the input data.

5. The method of claim 1, wherein a shape or color of different layers of the restoration block is obtained via defined layers provided in a 3D image of the restoration block or 3D model of the restoration block.

6. The method of claim 5, wherein the defined layers are indicated by straight or curved boundaries.

7. The method of claim 1, wherein the final user-specific tooth color includes a color of a plurality of tooth layers of the restoration.

8. The method of claim 1, wherein the at least one output restoration characteristic value includes a proposal of an optimal positioning of the restoration inside the restoration block.

9. The method of claim 1, wherein the at least one output restoration characteristic value includes a proposal of an optimal color of the restoration block.

10. The method of claim 1, wherein the at least one output restoration characteristic value includes a proposal of at least one internal structure of the restoration block.

11. The method of claim 1, wherein the at least one output restoration characteristic value includes a proposal of at least one manufacturing process required to achieve the final user-specific tooth color.

12. The method of claim 1, wherein the at least one output restoration characteristic value includes a proposal of at least one color of a 3D volume of material required of a 3D printer required to achieve the final user-specific tooth color.

13. The method of claim 1, further comprising:

providing feedback for the trained restoration material parameter recommendation module indicative of an accuracy of proposals to reinforce the trained restoration material parameter recommendation module.

14. The method of claim 1, wherein the properties include desired internal structures of the plurality of training restoration blocks and/or desired colors of the 3D printer materials.

15. The method of claim 1, wherein the at least one output restoration characteristic values include corresponding probability values.

16. A computer system comprising a processor configured to perform operations including: receiving a three-dimensional (3D) scan of a dental cavity of a patient; identifying, by an input resource, input data comprising at least one final tooth color influencing factor for a trained restoration material parameter recommendation module, the trained restoration material parameter recommendation module implemented as a neural network executing on a processor; extracting, responsive to the identifying, one or more features from the input data, the one or more features representative of a request for completing a design and/or machining process of a restoration, and presenting on a display, using the trained restoration material parameter recommendation module, at least one output restoration characteristic value needed to achieve a final user-specific tooth color for at least one tooth layer of the restoration, the final user-specific tooth color representative of an observed color of the restoration after installation in a patient's oral cavity, said observed color being influenced by said at least one final tooth color influencing factor; wherein the at least one final tooth color influencing factor for the input data comprises one or more of: physical characteristics of one or more portions of a restoration block or restoration material, physical characteristics of one or more portions of an oral cavity, scanner properties, a customer color preference, or manufacturing device available; wherein the trained restoration material parameter recommendation module is trained using a training input dataset that includes training input images and/or shades and stored corresponding training output restoration characteristic values obtained from a plurality of training restoration blocks and/or 3D printer materials that are selected to have properties that provide a plurality of final user-specific training tooth colors, wherein the training includes: providing the plurality of training restoration blocks and/or 3D printer materials; manufacturing a plurality of corresponding restorations using said plurality of training restoration blocks and/or 3D printer materials; installing the manufactured plurality of corresponding restorations on corresponding physical models or oral cavities; scanning said physical models or oral cavities to obtain corresponding images and/or shades for use as part of the training input dataset; providing the training input dataset as input to an untrained restoration material parameter recommendation module to produce the trained restoration material parameter recommendation module; obtaining corresponding output restoration characteristic values from the trained restoration material parameter recommendation module; and comparing said corresponding output restoration characteristic values to the stored corresponding training output restoration characteristic value.

17. A non-transitory computer-readable storage medium storing a program which, when executed by a computer system, causes the computer system to perform operations comprising: receiving a three-dimensional (3D) scan of a dental cavity of a patient; identifying, by an input resource, input data comprising at least one final tooth color influencing factor for a trained restoration material parameter recommendation module, the trained restoration material parameter recommendation module implemented as a neural network executing on a processor; extracting, responsive to the identifying, one or more features from the input data, the one or more features representative of a request for completing a design and/or machining process of a restoration, and presenting on a display, using the trained restoration material parameter recommendation module, at least one output restoration characteristic value needed to achieve a final user-specific tooth color for at least one tooth layer of the restoration, the final user-specific tooth color representative of an observed color of the restoration after installation in a patient's oral cavity, said observed color being influenced by said at least one final tooth color influencing factor; wherein the at least one final tooth color influencing factor for the input data comprises one or more of: physical characteristics of one or more portions of a restoration block or restoration material, physical characteristics of one or more portions of an oral cavity, scanner properties, a customer color preference, or manufacturing device available; wherein the trained restoration material parameter recommendation module is trained using a training input dataset that includes training input images and/or shades and stored corresponding training output restoration characteristic values obtained from a plurality of training restoration blocks and/or 3D printer materials that are selected to have properties that provide a plurality of final user-specific training tooth colors, wherein the training includes: providing the plurality of training restoration blocks and/or 3D printer materials; manufacturing a plurality of corresponding restorations using said plurality of training restoration blocks and/or 3D printer materials; installing the manufactured plurality of corresponding restorations on corresponding physical models or oral cavities; scanning said physical models or oral cavities to obtain corresponding images and/or shades for use as part of the training input dataset; providing the training input dataset as input to an untrained restoration material parameter recommendation module to produce the trained restoration material parameter recommendation module; obtaining corresponding output restoration characteristic values from the trained restoration material parameter recommendation module; and comparing said corresponding output restoration characteristic values to the stored corresponding training output restoration characteristic value.

* * * * *